United States Patent
Beyer et al.

(10) Patent No.: US 11,200,552 B2
(45) Date of Patent: Dec. 14, 2021

(54) REDEMPTION NETWORK WITH TRANSACTION SEQUENCER

(71) Applicant: Blackhawk Network, Pleasanton, CA (US)

(72) Inventors: Darren Beyer, Berkeley, CA (US); Casey Bostwick, Dublin, CA (US)

(73) Assignee: Blackhawk Network, Inc., Pleasanton, CA (US)

( * ) Notice: Subject to any disclaimer, the term of this patent is extended or adjusted under 35 U.S.C. 154(b) by 348 days.

(21) Appl. No.: 15/626,811

(22) Filed: Jun. 19, 2017

(65) Prior Publication Data

US 2017/0286937 A1    Oct. 5, 2017

Related U.S. Application Data

(63) Continuation of application No. 13/854,353, filed on Apr. 1, 2013, now Pat. No. 9,710,799.

(60) Provisional application No. 61/619,602, filed on Apr. 3, 2012.

(51) Int. Cl.
*G06Q 20/20* (2012.01)
*G06Q 20/40* (2012.01)

(52) U.S. Cl.
CPC .......... *G06Q 20/20* (2013.01); *G06Q 20/405* (2013.01)

(58) Field of Classification Search
CPC .............................. G06Q 20/20; G06Q 20/405
See application file for complete search history.

(56) References Cited

U.S. PATENT DOCUMENTS

| 6,016,305 | A  | * | 1/2000 | Borst    | H04L 12/5602 370/230 |
| 7,577,590 | B2 | * | 8/2009 | Zellner  | G06Q 10/087 705/26.1 |
| 8,515,873 | B2 | * | 8/2013 | Hawkins  | G06Q 20/04 235/379 |
| 9,710,799 | B2 |   | 7/2017 | Beyer et al. | |

(Continued)

OTHER PUBLICATIONS

"eWIC Integrated Retailer Interface Specifications". Retrieved from <https://wic.health.state.pa.us/VendorAssistant/Secured/Alerts/PA%20WIC%20EBT%20Integrated%20Retailer%20Interface%20Specifications%20v1.2%20FINAL.pdf>. Originally published Jan. 2017. (Year: 2017).*

(Continued)

*Primary Examiner* — Nathan A Mitchell
(74) *Attorney, Agent, or Firm* — Jerry C. Harris, Jr.

(57) ABSTRACT

A transaction sequencer that comprises a processor, a non-transitory memory, and an application stored in the non-transitory memory. The application receives a message comprising information about a first purchase item, wherein the message was created by a point-of-sale after a filtering step that assured that the first purchase item is associated with a master approved item list, searches a plurality of different approved product lists using the information about the first item, wherein the plurality of different approved product lists comprise a first approved product list and a second approved product list, creates a first transaction based on finding the first item in the first approved product list, transmits the first transaction to a first transaction processing system, receives a first response from the first transaction processing system, bundles the first response in a unified response, and transmits the unified response.

5 Claims, 7 Drawing Sheets

(56) References Cited

U.S. PATENT DOCUMENTS

| | | | | |
|---|---|---|---|---|
| 2002/0120539 A1* | 8/2002 | Price | .................. | G06Q 20/202 |
| | | | | 705/35 |
| 2005/0165682 A1* | 7/2005 | Duke | .................. | G06Q 20/04 |
| | | | | 705/41 |
| 2006/0047569 A1* | 3/2006 | Sulaiman | ............... | G06Q 30/02 |
| | | | | 705/14.25 |
| 2006/0074784 A1* | 4/2006 | Brown | .................. | G06Q 20/20 |
| | | | | 705/35 |
| 2006/0289636 A1* | 12/2006 | Hoblit | ................. | G06Q 20/363 |
| | | | | 235/383 |
| 2008/0189184 A1* | 8/2008 | Kubo | .................... | G06Q 20/12 |
| | | | | 705/16 |
| 2010/0057611 A1* | 3/2010 | Antoo | .................. | G06Q 20/10 |
| | | | | 705/39 |
| 2012/0150697 A1* | 6/2012 | Wade | ................ | G06Q 30/0643 |
| | | | | 705/27.2 |
| 2012/0233074 A1* | 9/2012 | Dangott | ................ | G06Q 40/06 |
| | | | | 705/44 |
| 2013/0103487 A1* | 4/2013 | Nordstrand | ......... | G06Q 20/387 |
| | | | | 705/14.38 |

OTHER PUBLICATIONS

Filing receipt and specification for provisional patent application entitled "Redemption Network with Transaction Sequencer" by Darren Beyer, et al., filed Apr. 3, 2012 as U.S. Appl. No. 61/619,602.

* cited by examiner

REDEMPTION NETWORK WITH TRANSACTION SEQUENCER

CROSS-REFERENCE TO RELATED APPLICATIONS

This application is a continuation application of, and claims priority to, U.S. patent application Ser. No. 13/854,353 filed Apr. 1, 2013, which claims priority to U.S. Provisional Patent Application Ser. No. 61/619,602 filed Apr. 3, 2012 and entitled "Redemption Network with Transaction Sequencer," which is incorporated by reference herein in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Point-of-sale (POS) terminals may be used as a processing station for identifying products, determining a price of the products, accumulating a total purchase price for the products, determining a sales tax on the products, receiving a tender of payment for the products, and optionally conducting a redemption and/or payment electronic transaction via a communication network. For example, the POS terminal may be a check-out station in a grocery store. Products in a customer's shopping basket may be read by a bar code scanner coupled to the POS terminal. The POS terminal may identify the prices of each of a plurality of purchase items. The purchase items may comprise apples, hamburger, bread, uncooked rice, a chocolate cake from a grocery bakery, a six-pack of beer, a bottle of fish oil capsules, a women's fashion magazine, and a digital music pre-paid card. The POS terminal may accumulate a list of items purchased, e.g., a list of universal product codes (UPCs), sum the purchase prices, determine a sales tax for the purchase items, and determine a total price for the customer to pay.

The POS terminal may be configured to accept payment for the purchases in a variety of different forms of tender. The purchaser may pay for the purchases with cash. The purchaser may pay for the purchases with cash, a credit card, a debit card, a stored value card, food stamps, WIC tender, other payment vehicles, or a combination thereof. When a purchaser pays for items with some payment vehicles, for example with food stamps and/or with WIC tenders, the POS terminal may desirably distinguish purchase items that may be paid for with these tenders from other purchase items that may be prohibited for purchase with these tenders. For example, it may be that according to locally applicable laws or codes, uncooked rice may be purchased with food stamps and/or WIC tenders, while a women's fashion magazine may not be purchased with food stamps and/or WIC tenders.

SUMMARY

In an embodiment, a transaction sequencer is disclosed. The transaction sequencer comprises a processor, a non-transitory memory, and an application stored in the non-transitory memory. When executed by the processor, the application receives a message comprising information about a first purchase item, wherein the message was created by a point-of-sale after a filtering step that assured that the first purchase item is associated with a master approved item list, searches a plurality of different approved product lists using the information about the first item, wherein the plurality of different approved product lists comprise a first approved product list and a second approved product list, creates a first transaction based on finding the first item in the first approved product list, transmits the first transaction to a first transaction processing system, receives a first response from the first transaction processing system, bundles the first response in a unified response, and transmits the unified response.

In an embodiment, an approved product list management system is disclosed. The approved product list management system comprises a processor, a non-transitory memory, and an application stored in the non-transitory memory. When executed by the processor, the application builds a first master approved product list that identifies the products identified in a plurality of approved product lists, transmits the first master approved product list to a first point-of-sale terminal and to a second point-of-sale terminal, builds a second master approved product list based on a change in one of the approved product lists, and transmits the second master approved product list to the first point-of-sale terminal and to the second point-of-sale terminal.

In an embodiment, a method of payment transaction handling is disclosed. The method comprises receiving a first transaction message comprising identification of a first purchase item, wherein the first purchase item is identified in a master approved product list propagated to a plurality of point-of-sale terminals, and searching a first approved product list for the first purchase item, where the first approved product list is associated with a first payment program identified in the first transaction message and all the items in the first approved product list are identified in the master approved product list. When the first approved product list comprises the first purchase item, the method further comprises completing a payment transaction for the first purchase item. The method further comprises receiving a second transaction message comprising identification of a second purchase item, wherein the second purchase item is identified in the master approved product list and searching a second approved product list for the second purchase item, where the second approved product list is associated with a second payment program identified in the second transaction message, where all the items in the second approved product list are identified in the master approved product list, and where the first approved product list is different from the second approved product list. When the second approved product list comprises the second purchase item, the method further comprises completing a payment transaction for the second purchase item.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
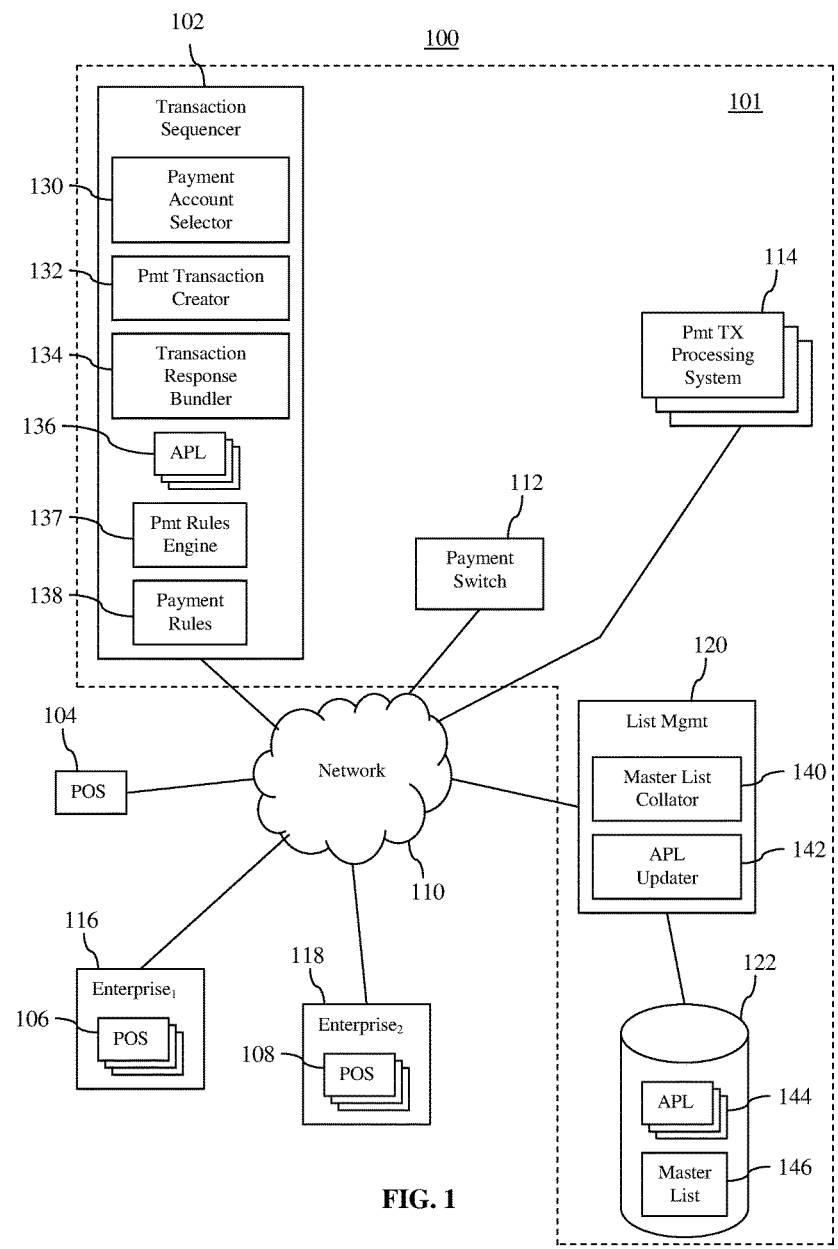
FIG. 1 is a block diagram of a redemption processing system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A redemption payment system comprising a transaction sequencer is described herein. A POS terminal may apply a variety of different rules to determine a purchase price, to receive payment tenders from the purchaser, and to redeem these payment tenders. According to an embodiment, the POS terminal is configured with a master approved product list that identifies all of the items that are listed on at least one approved product list of one payment program. The POS terminal may identify those purchase items in a customer's shopping basket that are identified in the master approved product list and send a redemption transaction message to a redemption system for processing and receiving payment for those identified items. Purchase items that are not associated with any item in the master approved product list may be paid for with cash or with some other payment tender by the customer. The redemption transaction message identifies the approved items and identifies one or more payment tenders. For example, the redemption transaction message may comprise one or more bank identification numbers (BINs), such as a first BIN associated with the customer's bank debit card and a second BIN associated with a state issued women, infants, and children (WIC) tender debit card.

A transaction sequencer receives the redemption transaction message and determines what payment tenders will be used to pay for which purchase items. The transaction sequencer searches a plurality of approved product lists (APLs) to determine which APLs identify each purchase item. When two or more APLs identify the same purchase item, the transaction sequencer applies predefined rules to determine what account or tender will be applied to redeem the subject purchase item. For example, if a state issued debit card is tendered that carries funds for unemployment benefits, food stamp tenders, and WIC tenders, and if a purchase item is on an unemployment benefit APL, on a food stamp APL, and on a WIC APL, the transaction sequencer may apply rules defined by a program manager or by an issuing state for how to arbitrate payment from one of the unemployment benefits, food stamp tenders, and WIC tenders associated with the state issued debit card.

The transaction sequencer may create a plurality of payment transaction messages associated with the plurality of payment tenders associated with the single redemption transaction message received by the transaction sequencer. The payment transaction messages may be transmitted to different payment transaction processing systems. The payment transaction processing systems may return a transaction response message to the transaction sequencer. The transaction sequencer may stitch together or otherwise bundle a plurality of transaction responses from the several payment transaction processing systems into a single redemption response message and transmit this single redemption response message to the POS terminal.

A list management system may maintain a plurality of APLs. For example, the list management system may maintain at least one flexible spending account (FSA) APL, at least one unemployment benefits APL, at least one food stamp APL, at least one WIC tender APL, at least one wellness program benefits APL, other APLs, or combinations thereof. As one of the APLs is changed, the list management system may receive an update message from the authorized source of the subject APL, for example an update of the food stamp APL may be received from a US federal government source. In response to receiving an APL update message, the list management system may modify one or more APLs. The APL update message may entail adding a new approved item, deleting a previously approved item, or may involve some other modification of an approved item. The list management system may push APL updates to the transaction sequencer, so that the APLs accessed by the transaction sequencer are maintained current.

The list management system may create sub-lists based on the complete APLs that may be suitable for use by individual retail collaborators. For example, a FSA sub-list may be created for a first retail store which is a sub-set of the full FSA APL that excludes products that the first retail store does not offer for sale. The list management system may determine a master approved product list based on the APLs and/or based on the sub-list APLs. The master approved product list may be determined by creating a single entry for each item listed in any one of the APLs and/or any one of the sub-list APLs, and excluding any double entries. The list management system may push the master approved product list—either a comprehensive master approved product list or a master approved product list built using sub-list APLs—to one or more POS terminals.

Turning now to FIG. 1, a system 100 is described. In an embodiment, the system 100 comprises a transaction sequencer 102, a first point-of-sale terminal 104, a second point-of-sale terminal 106, a third point-of-sale terminal 108, a network 110, a payment switch 112, a payment transaction processing system 114, a list management system 120, and a list data store 122. In an embodiment, the transaction sequencer 102, the payment switch 112, the payment transaction processing system 114, the list management system 120, and the list data store 122 may be considered to form at least part of a sub-system 101. It will be appreciated by those skilled in the art that a variety of alternative configurations and implementations of the system 100 are possible, and the present disclosure contemplates these alternative configurations and implementations. The network 110 may comprise any combination of private and public networks, for example a combination of the public Internet and one or more local area networks. It is understood that the network 110 may promote a variety of different communication functionality, including, for example, virtual private network (VPN) tunneling and other data communication functionality. In some contexts the system 100 may be referred to as a redemption network with a transaction sequencer.

The first point-of-sale terminal 104 may be an isolated terminal, for example in a very small business. The second point-of-sale terminal 106 may be one of a plurality of point-of-sale terminals in a first enterprise 116, for example a grocery store. The third point-of-sale terminal 108 may be one of a plurality of point-of-sale terminals in a second enterprise 118, for example a pharmacy. In an embodiment, the first enterprise 116 may be different from the second enterprise 118, and the items offered for sale by the first enterprise 116 may be different from the items offered for sale by the second enterprise 118. To promote conciseness, the point-of-sale terminals 104, 106, 108 may be referred to as first POS 104, second POS 106, and third POS 108. The POS 104, 106, 108 may be an e-commerce site, an on-line business POS, a virtual POS, or a POS located in a brick-and-mortar building.

In an embodiment, the system 100 may be coupled to only one enterprise, for example to a chain of grocery stores. This embodiment may be preferred by an enterprise that is concerned about the confidentiality of their transaction information. The enterprise may also feel that it may be better able to request customized redemption functionality if it is the sole enterprise served by the system 100 rather than merely one among several enterprises serviced by the system 100. In an embodiment, an enterprise may be served by a dedicated transaction sequencer 102 (e.g., that transaction sequencer serves only that enterprise) but may receive master approved product list updates from a list management system 120 that serves a plurality of different enterprises.

The payment transaction processing system 114 may comprise a plurality of separate payment transaction processing systems. For example, the system 100 may comprise a first payment transaction processing system 114a, a second payment transaction processing system 114b, and a third payment transaction processing system 114c. The first payment transaction processing system 114a may be associated with a private debit card, for example a commercial credit union/bank, and may be associated with a first bank identification number (BIN). The second payment transaction processing system 114b may be associated with a state issued debit card, for example a state issued debit card combining funds, accounts, and/or purses for monetary benefits such as unemployment benefits and/or income tax overpayment repayment, food stamp benefits, WIC tenders, and others, and may be associated with a second BIN. The third payment transaction processing system 114c may be associated with a third BIN. In an embodiment, one or more of the payment transaction processing systems 114 may be combined in a computer system with the transaction sequencer 102. In some contexts a payment transaction processing system 114 may be referred to as an ISO transaction processing system.

While the payment transaction processing systems 114 are illustrated in FIG. 1 as being part of the sub-system 101, in an embodiment, one or more of the payment transaction processing systems 114 may be separate from the sub-system 101, possibly associated with different programs.

In an embodiment, the system 100 comprises a payment switch 112. Redemption, payment, and/or transaction messages among the POS 104, 106, 108, the transaction sequencer 102, and the payment transaction processing systems 114 may pass through the payment switch 112. This communication architecture may promote simplified communications, for example simplified communications for the POS 104, 106, 108, buffering these nodes from communications architecture and/or routing changes. In another embodiment, however, the system 100 does not comprise a payment switch 112.

The list management system 120 maintains a plurality of approved product lists (APLs) 144 and builds a master approved product list 146 based on the APLs 144. In an embodiment, a master list collator 140 may build the master approved product list 146. In some contexts, the list management system 120 may be referred to as an approved product list management system. The APLs 144 may comprise a FSA APL, a food stamp APL, a WIC APL, an unemployment benefits APL, a wellness program APL. The APLs 144 may comprise a cholesterol wellness program APL, a diabetes wellness program APL, a high blood pressure wellness program APL, an obesity wellness program APL, and other health condition specific wellness program APLs.

In an embodiment, the master APL 146 comprises a single entry for every entry contained in at least one of the APLs 144. If, for example, a first APL contains an entry for a product and a second APL contains an entry for the same product, the master APL 146 will contain a single entry for the subject product. In some cases, however, the master APL 146 may comprise some duplicate product entries, for example in the case of an error or for some other reason. In an embodiment, the master list collator 140 may exclude some items in the master APL 146 that are contained in at least one of the APLs 144, for example when an enterprise does not offer the excluded item for purchase. In an embodiment, the master list collator 140 may build distinct master APLs for each of a plurality of enterprises, excluding items from each master APL that are not sold by the subject enterprise. When the list management system 120 receives a message identifying a change in one of the APLs 144, for example a message sent by a source of the subject APL such as a federal agency in charge of promulgating a food stamp APL, the master list collator 140 may rebuild the master APL 144. The list management system 120 may push a copy of the master APL 146 to POS 104, 106, 108 periodically, on the event of a change in one of the APLs 144, or both periodically and on event of a change in an APL 144.

Figure 2:
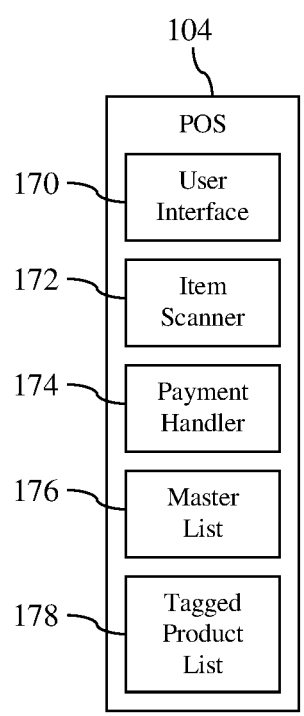
FIG. 2 is a block diagram of a point-of-sale terminal according to an embodiment of the disclosure.

Turning now to FIG. 2, further details of the first POS 104 are described. In an embodiment, the first POS 104 comprises a user interface 170, an item scanner 172, a payment handler 174, and a copy of the master APL 176. The copy of the master APL 176, referred to hereinafter simply as master APL 176, is a copy of the master APL 146 received from the list management system 120. It will be appreciated that in different embodiments the components 170, 172, 174, and 176 may be implemented as either fewer components or more components. For example, in an embodiment, the functionality of two or more of the components 170, 172, 174, and 176 may be combined in a single component. Likewise, in an embodiment, the functionality of at least one of the components 170, 172, 174, and 176 may be provided by two or more components.

The master APL 176 may occasionally be updated by the list manager system 120. When a customer presents shopping basket items for purchase at the first POS 104, the item scanner 172 scans the subject items and identifies them. The payment handler 174 accumulates the scanned items in a list of items, determined a price and a tax associated with the items. In an embodiment, the second POS 106 and the third POS 108 may be substantially similar to the first POS 104.

In an embodiment, the POS 104 further comprises a tagged product list 178. The tagged product list 178 may comprise all of the items offered for sale via the POS 104—for example a list of all retail items offered for sale in a grocery store where the POS 104 may be installed—where some of the items on the list may be tagged as being present on the master APL 176 and other items on the list are not tagged and hence are deemed to be not present on the master APL 176. The tagged product list 178 may be created by the POS 104 based on the master list 176. Alternatively, the POS 104 may not comprise the master APL 176, and some other system may create the tagged product list 178 and push the tagged product list 178 to the POS 104. For example, in an embodiment, a server computer (not shown) in an enterprise associated with the POS 104 builds the tagged product list 178 based on the master APL 176 and pushes the tagged product list 178 to the POS 104.

Referring again to FIG. 1, when a customer presents a payment tender or a payment vehicle—for example food stamps, WIC tenders, a flexible spending account (FSA) card, a state debit card that may provide access to one or more of a food stamp account, a WIC tender account, an unemployment benefits account—the POS 104 may check that each item in the customer shopping basket is identified in the master APL 176. Alternatively, the POS 104 may check each item in the customer shopping basket against the tagged product list 178 to see if the subject item is tagged and hence identified in the master APL 176. The payment handler 174 creates a redemption transaction message that lists those items present in the master APL 176 or tagged in the tagged product list 178 and that identifies the payment vehicle. The transaction message may identify each item that the POS 104, 106, 108 found in the master APL 176 or tagged in the tagged product list 178. For each identified item, the transaction message may include a universal product code (UPC) identifying the item, a price of the item, a sales tax of the item, and a quantity of the item. The transaction message may also identify one or more payment vehicles that have been presented by the customer for tendering payment for the items. The payment vehicles may be identified by a bank identification number (BIN) or by some other identification. The payment handler 174 then sends the redemption transaction message to the transaction sequencer 102.

The POS 104, 106, 108 transmits the redemption transaction message to the transaction sequencer 102, possibly routing through the payment switch 112. In an embodiment, the transaction sequencer 102 may comprise a payment account selector 130, a payment transaction creator 132, a transaction response bundler 134, a plurality of APLs 136, a payment rules engine 137, and payment rules 138. It will be appreciated that, in an embodiment, the functionality of at least two of the components 130, 132, 134, and 137 may combined in a single component. Likewise, in an embodiment, the functionality of one or more of the components 130, 132, 134, and 137 may be provided by two or more components.

The payment account selector 130 searches the APLs 136 for each of the items identified in the redemption transaction message and selects a payment account or a purse from which to pay for the subject item. In some contexts, a payment account or a payment purse may be referred to as a payment entity. In an embodiment, the payment account selector 130 may search only those APLs 136 associated with the payment vehicle or payment vehicles identified in the redemption transaction message. For example, if an item is listed in an FSA APL but only a WIC tender payment vehicle is identified in the redemption transaction message, the payment account selector 130 may search only a WIC APL to find the subject item. When two APLs 136 list the same item identified in the redemption message, the payment account selector 130 may execute rules defined in the payment rules 138 to select from which account or purse to pay for the item. For example, the payment account selector 130 may execute the payment rules engine 137, and the payment rules engine 137 may select from which account or purse to pay for the item based on the rules defined in the payment rules 138

The identification of a purse or account from which to pay for the item or items may be referred to in some contexts as dual level filtering, because the item is first filtered at the POS 104, 106, 108 (that is, the item is only included in the redemption transaction message in the first place if the POS determines that the item is on the master APL 176 or is tagged in the tagged product list 178) and then secondly filtered by the transaction sequencer 102 against the APLs 136. The use of such a dual level filtering may promote an enterprise or POS 104, 106, 108 maintaining increased control and confidentiality of customer purchasing data which may comprise sensitive and/or valuable business knowledge that the enterprise does not wish to share with other businesses.

After determining a payment account or purse from which to pay for each of the items identified in the redemption transaction message, the payment account selector 130 passes item payment account information associated with the selected payment account or purse to the payment transaction creator 132. Based on the item payment account information received from the payment account selector 130, the payment transaction creator 132 builds one or more payment transaction messages. In an embodiment, the payment transaction messages are built in conformance with the International Organization for Standardization (ISO) 8583 Financial Transaction Card Originated Messages—Interchange Message specification, but in other embodiments a different payment transaction message format may be used. A payment transaction message built in conformity to the ISO 8583 standard may be referred to as an ISO 8583 transaction message. In some contexts, the term transaction may refer to both a payment transaction message and a corresponding payment transaction response message.

The payment transaction creator 132 may bundle a plurality of items to be paid from the same payment account or purse into a single payment transaction message. The payment transaction creator 132 transmits the payment transaction messages to one or more payment transaction processing systems 114, possibly routing the payment transaction messages via the payment switch 112. In some scenarios, two or more payment transaction messages may be transmitted to one payment transaction processing system 114, for example when some purchase items identified in one payment transaction message are to paid from a food stamps purse and other purchase items identified in another payment transaction message are to be paid from a WIC purse and when the food stamps purse and the WIC purse are managed by a single state operated payment transaction processing system 114.

Each payment transaction processing system 114 receiving a payment transaction message processes the message and returns a transaction response message indicating whether payment in full has been made, whether no payment has been made, or if a partial payment has been made. For example, if the cost of the items identified in the payment transaction message exceeds a funds balance in the subject purse, the payment transaction processing system 114 may pay for some of the items until the purse is substantially emptied, and then deny payment on the remaining items. The transaction response message may identify which items have been paid for and which items have not been paid for by the subject payment transaction processing system 114. The payment transaction processing systems 114 may return the transaction response messages to the payment switch 112, and the payment switch 112 may transmit the transaction response messages to the transaction response bundler 134.

The transaction response bundler 134 may combine or stitch together several transaction response messages associated with a single redemption transmission message into a single redemption transmission response message and transmit the single redemption transmission response message to the POS 104, 106, 108. This single redemption transmission response message may be referred to as a bundled response or as a unified response in some contexts. The redemption transmission response message identifies which items have been paid for out of which accounts or purses and which items have not been paid. Items may not be paid because they were not listed in an appropriate APL 136 (for example, an item present in the master APL 176 may not be present in the APL 136 associated with the payment vehicle identified in the redemption transmission message). Likewise, items may not be paid because a purse ran short of funds. The POS 104, 106, 108 may respond to unpaid items in a variety of manners. The POS 104, 106, 108 may notify the customer, via a check-out clerk, that specific items have not been paid with the presented payment vehicle and request that additional payment tenders be presented, either as cash payment or as a different payment card. For example, a customer may present an FSA debit card after first presenting a state issued food stamp/WIC/unemployment benefit card to pay for those items that may be paid for with that payment vehicle. In this case, the POS 104, 106, 108 may create another redemption transaction message identifying the unpaid items that are found in the master APL 176 and identifying a different payment vehicle, and the above described processing may be repeated.

Figure 3A:
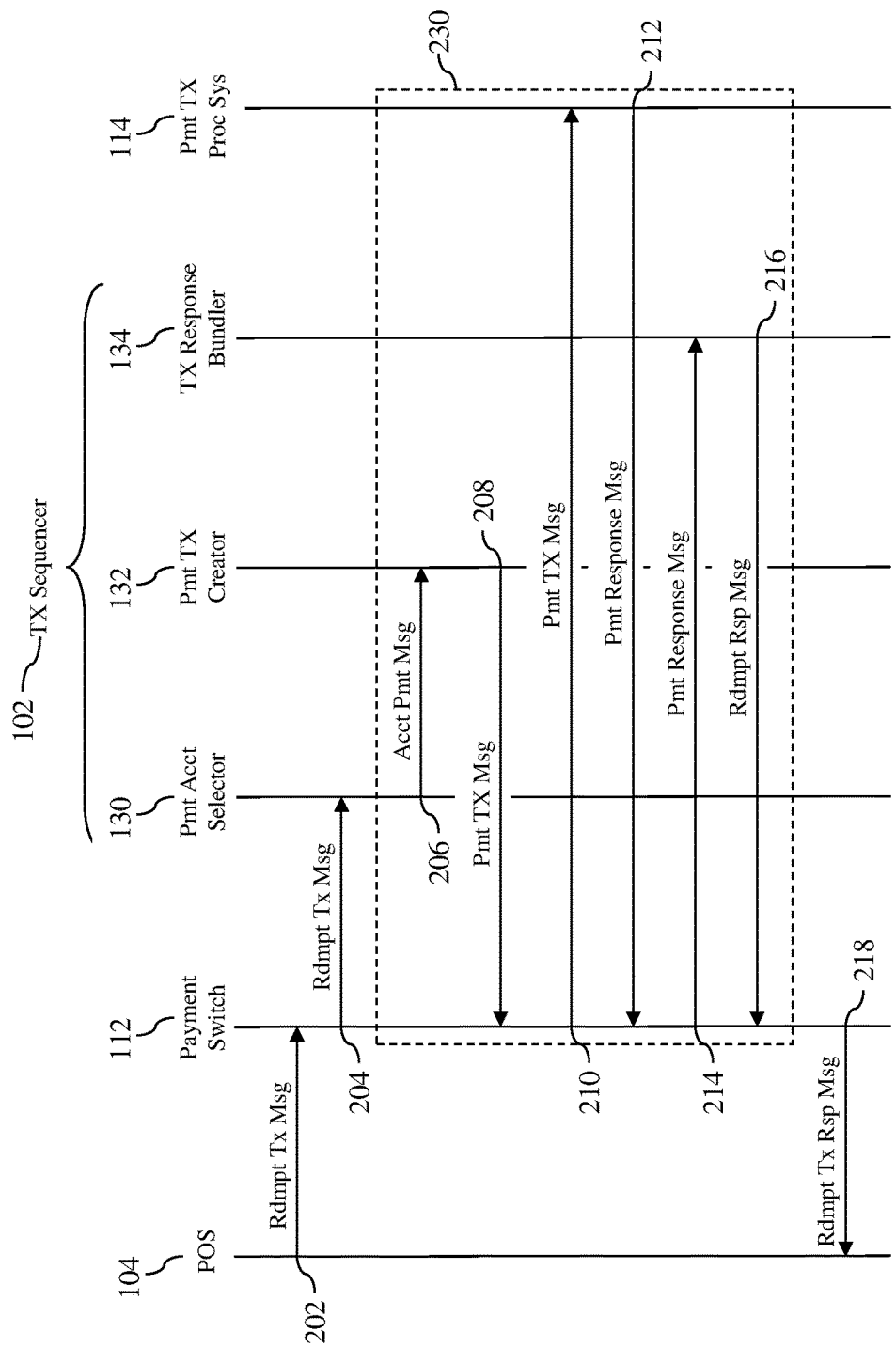
FIG. 3A is a message sequence diagram for a redemption process according to an embodiment of the disclosure.

Turning now to FIG. 3A, a message sequence is described. The POS 104 builds and transmits a redemption transaction message 202 to the payment switch 112. The payment switch 112 forwards the redemption transaction message 204 to the payment account selector 130. The payment account selector 130 searches the APLs 136 for the item or items identified in the redemption transaction message 204, determines a payment account or purse from which to pay for the item or items, and transmits this information to the payment transaction creator 132 in an account payment message 206.

The payment transaction creator 132 creates a payment transaction message 208 and transmits the message 208 to the payment switch 112. The payment switch 112 transmits a payment transmit message 210 to the subject payment transaction processing system 114. The payment transaction processing system 114 processes the message 210, generates a transaction response message 212, and transmits the message 212 to the payment switch 112. The payment switch 112 forwards the transaction response message 214 to the transaction response bundler 134. The transaction response bundler 134 creates a redemption transmission response message 216 and transmits the message to the payment switch 112. The payment switch 112 transmits a redemption transaction response message 218 to the POS 104.

Figure 3B:
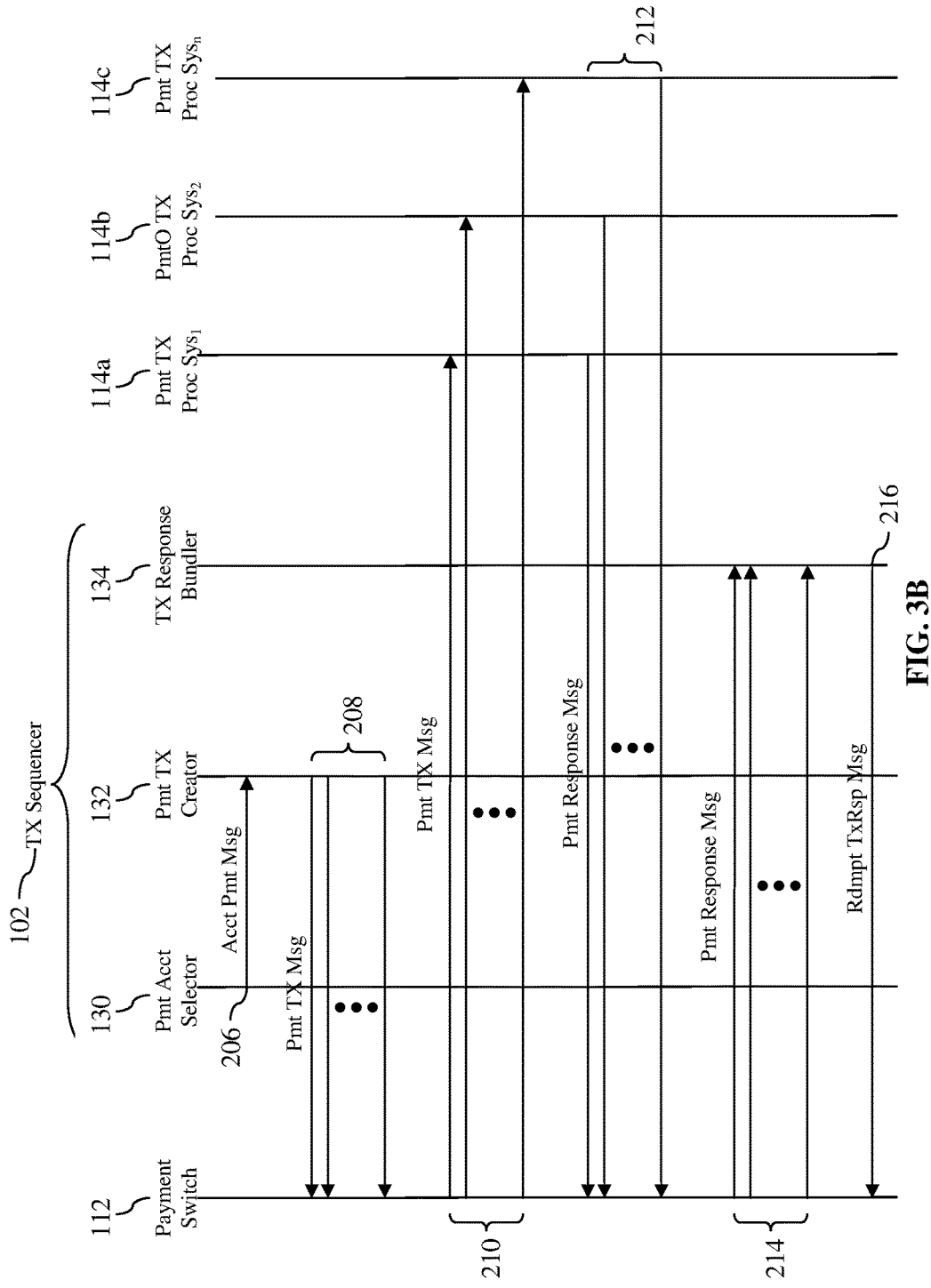
FIG. 3B is a message sequence diagram of a portion of a redemption process according to an embodiment of the disclosure.

In an alternative scenario, the processing within the dotted box 230 may proceed differently when a plurality of payment accounts or purses are identified in the redemption transmission message 202, 204, as described now with reference to FIG. 3B.

In some scenarios, the payment account selector 130 may identify a plurality of payment accounts or purses form which to pay for the items identified in the redemption transaction message 202, 204. For example, the redemption transaction message 202, 204 may identify a plurality of payment vehicles, for example a FSA debit card that associates to a FSA purse and a state issued unemployment benefits card that associates to an unemployment benefits purse. Alternatively, the redemption transaction message 202, 204 may identify a state issued food stamps/WIC tender card that associates to a food stamps purse and a WIC purse. When the payment account selector 130 selects two or more payment accounts or purses from which to pay for the items, the payment transaction creator 132 creates a plurality of payment transaction messages 208, a different message 208 for each different purse, that it transmits to the payment switch 112.

The payment switch 112 forwards the messages 210 to the several payment processing systems 114 identified by the messages 208. Each of the payment processing systems 114 returns a transaction response message 212 to the payment switch 112. The payment switch transmits the several transaction response messages 214 to the transaction response bundler 134. The transaction response bundler 134 bundles or stitches together the several messages 214 into a single redemption transaction response message 216 and transmits the message 216 to the payment switch 112 which forwards the message to the POS 104.

Figure 4:
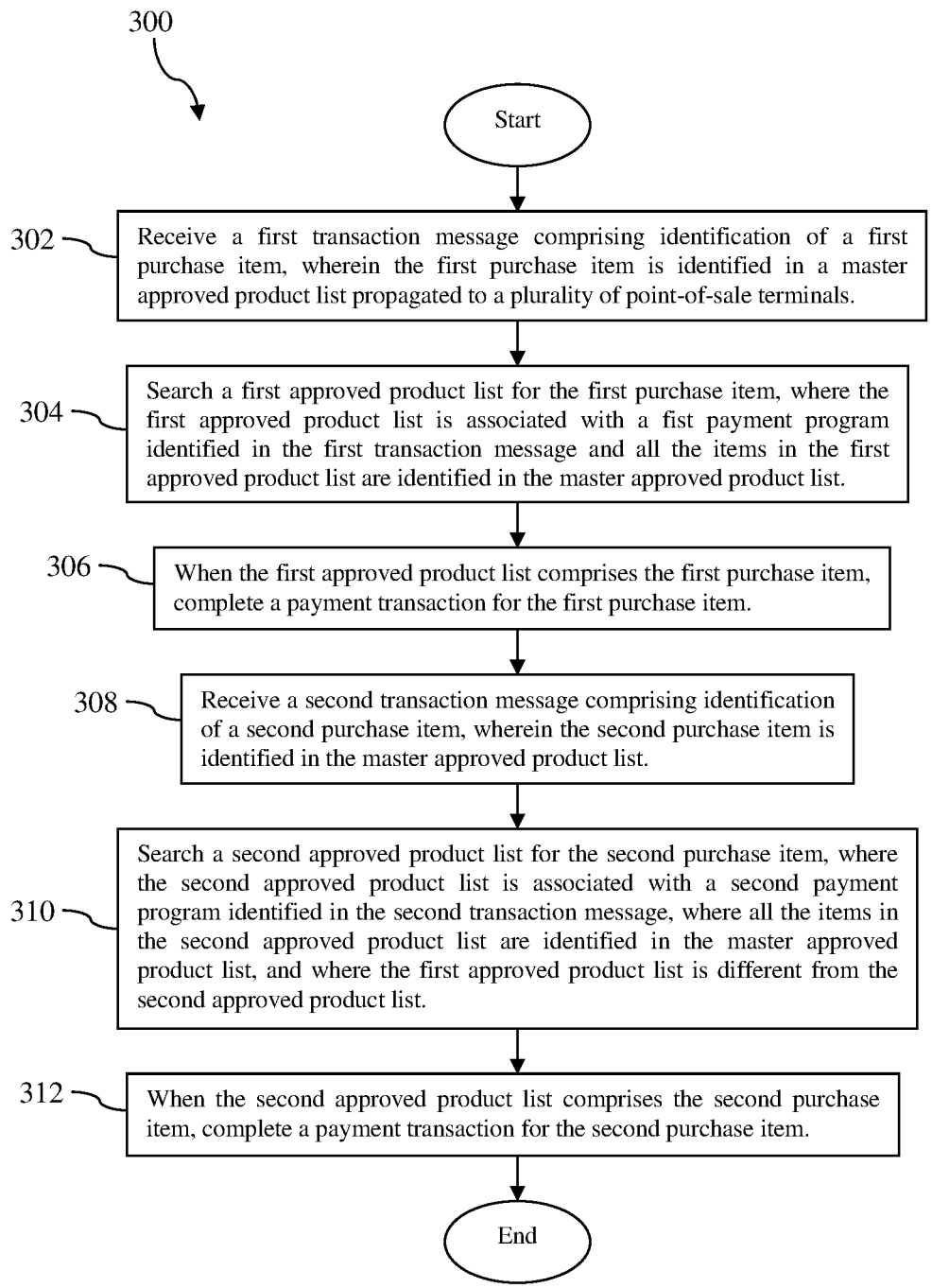
FIG. 4 is a flow diagram of a method according to an embodiment of the disclosure.

Turning now to FIG. 4, a method 300 is described. At block 302, a first transaction message comprising identification of a first purchase item is received, wherein the first purchase item is identified in a master approved product list propagated to a plurality of point-of-sale terminals. Alternatively, the first purchase item may be determined to be present and tagged in a tagged product list propagated to the point-of-sale terminals. It is noted that when the first purchase item is identified as tagged in the tagged product list 178 it can also be said to be a member of the master APL 176, because that the tagged product list 178 may be said to be based on or derived from the master APL 176. For example, the first transaction message is created and transmitted by the POS 104, 106, 108 to the transaction sequencer 102 (possibly via the payment switch 112). In some scenarios, the first transaction message may identify a plurality of purchase items, including the first purchase item. The POS 104, 106, 108 may first determine the subject purchase items are listed in the master APL 176 before identifying these purchase items in the first transaction message.

At block 304, a first approved product list is searched for the first purchase item, where the first approved product list is associated with a first payment program identified in the first transaction message and all the items in the first approved product list are identified in the master approved product list. For example, a food stamp APL 136 is searched for the first purchase item and any other purchase items identified in the first transaction message. The first transaction message may identify a food stamp program as a payment source for the purchase items identified in the first transaction message.

At block 306, when the first approved product list comprises the first purchase item, a payment transaction is completed for the first purchase item. For example, when the first purchase item is found in the food stamp APL 136, complete a payment transaction for the first purchase item against a food stamp payment account or purse. For example, create and transmit an ISO 8583 transaction message to a food stamp program payment transaction processing system 114.

At block 308, a second transaction message comprising identification of a second purchase item is received, wherein the second purchase item is identified in the master approved product list or is identified as tagged in the tagged product list. For example, the POS 104, 106, 108 searches the master APL 176 or the tagged product list 178 for the second purchase item, creates the second transaction message identifying the second purchase item and a payment account or purse, and transmits the second transaction message to the transaction sequencer 102.

At block 310, a second approved product list is searched for the second purchase item, where the second approved product list is associated with a second payment program identified in the second transaction message, where all the items in the second approved product list are identified in the master approved product list, and where the first approved product list is different from the second approved product list. For example, the second transaction message identifies a WIC payment account, and a WIC APL 136 is searched for the second purchase item. At block 312, when the second approved product list comprises the second purchase item, a payment transaction is completed for the second purchase item. For example, when the payment account selector 130 finds the second purchase item listed in the WIC APL 136, a transaction for payment for the second purchase item is completed with a WIC payment transaction processing system 114.

Figure 5:
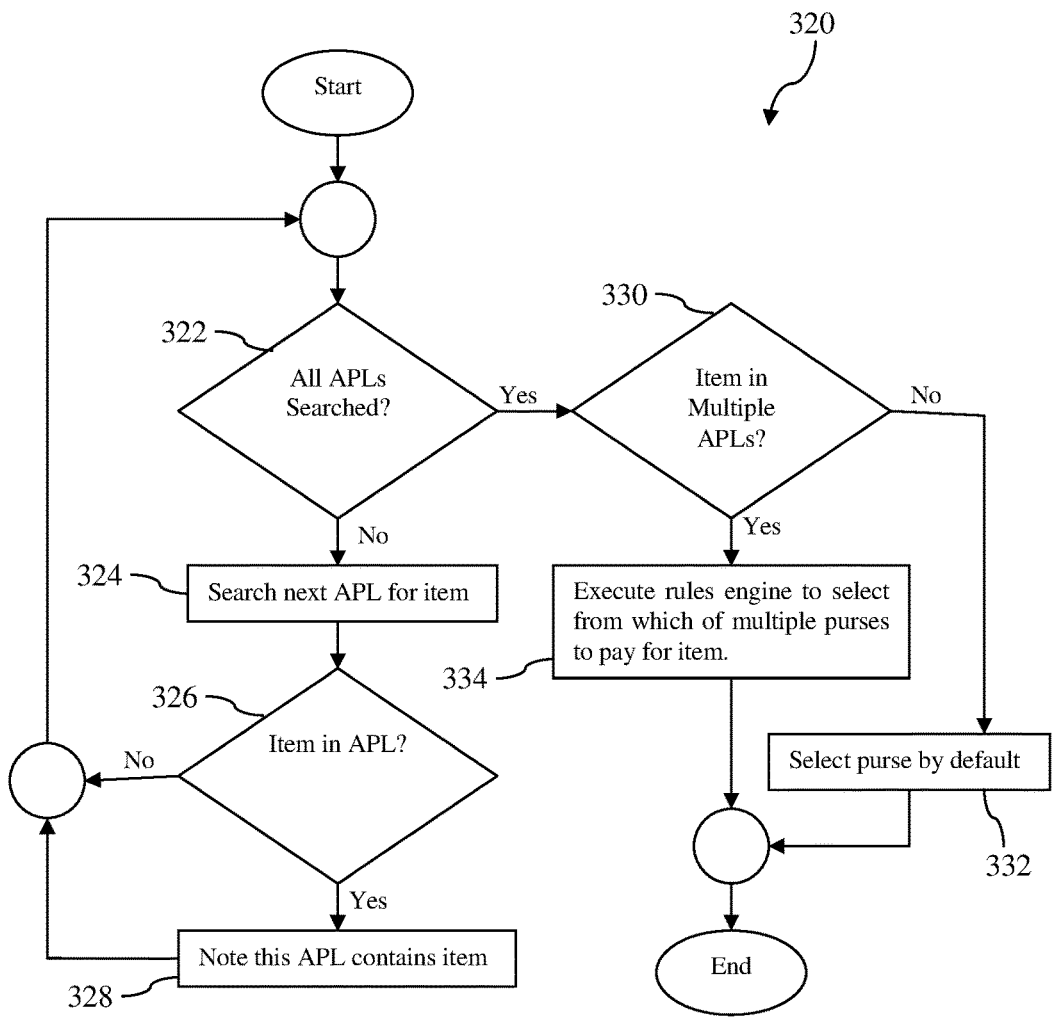
FIG. 5 is a flow diagram of a method according to an embodiment of the disclosure.

Turning now to FIG. 5, a method 320 is described. In an embodiment, the method 320 may be consistent with some of the processing described above with reference to FIG. 1 and FIG. 4. For example, the method 320 may be in part performed during the processing of block 304 and/or block 310 of method 300 described above with reference to FIG. 4. At block 322, if all of the APLs 136 have not been searched, processing proceeds to block 324. At block 324 one of the yet unsearched APLs 136 is searched for the subject item. At block 326, if the item is found in the subject APL 136, observance is taken of the membership of the item in the subject APL 136, for example a note of this membership is taken. The processing then proceeds back to block 322. At block 326, if the item is not found in the subject APL 136, processing proceeds directly back to block 322.

At block 322, if all APLs 136 have been searched for the subject item, the processing proceeds to block 330. At block 330, if the subject item is not noted to be a member of multiple APLs 136, the processing proceeds to block 332.

At block 332, a payment purse or payment account is selected, for example one of the payment transaction processing systems 114 is selected. Because, under the scenario that flows to block 332, the subject item is not a member of multiple APLs 136 it is presumed to be a member of one APL 136, and the payment purse or payment account is selected in view of this single APL 136. This may be referred to as selecting the payment purse or payment account by default because there is only one logically possible payment purse or payment account that has been identified. The item is presumed to be on at least one APL 136, because the POS 104, 106, 108 built the redemption transaction message containing the subject item and sent this message to the transaction sequencer 102 after first determining that the item is a member of the master APL 176 and/or is tagged in the tagged product list 178, and hence is a member of some one of the APLs 136. In an embodiment, the method 320 may further include one or more processing steps to confirm that the subject item is in fact a member of at least one APL 136 and when it is not on any APL 136 to generate an appropriate exception.

At block 330, if the subject item is noted to be a member of multiple APLs 136, the processing proceeds to block 334. At block 334, the payment rules engine 137 may be invoked to arbitrate from which of the payment purses or payment accounts associated with the multiple APLs 136 to pay for the subject item. The payment rules engine 137 may execute rules logic based on predefined rules stored in the payment rules 138 and select a payment purse or payment account and hence one of the payment transaction processing systems 114 to which to send a payment transaction. It will be appreciated that a variety of different payment rules may be defined.

A payment rule may define a sequence of priorities. For example, if the item is found on a first most preferred APL, pay for the item from a first purse associated with the first most preferred AP; else, if the item is found on a second most preferred APL, pay for the item from a second purse associated with the second most preferred APL; otherwise, pay for the item from a third purse. A payment rule may define a preferred ratio of payments between specific programs. For example, a state may define that the value of payments from a food stamp purse and the value of payments from a state funded WIC maintain a ratio of about 2:1, under the circumstance when the subject item is a member of both a food stamp APL 136 and a WIC APL 136. The rule may define a preferred ratio of payment distribution among different programs that takes into account profile information about the customer which may be included in the redemption transaction message created by the POS 104, 106, 108, for example a number of dependent children. The rule may define a ratio that is dependent on a funds balance of a customer. The rule may define a ratio that is dependent on a funds balance of the program itself, for example a funds balance in a state food stamp program a funds balance in a state WIC program. These are some examples, and it is understood that the predefined rules may define yet other rules for selecting which of multiple payment purses may pay for items when the items are members of multiple APLs 136.

Figure 6:
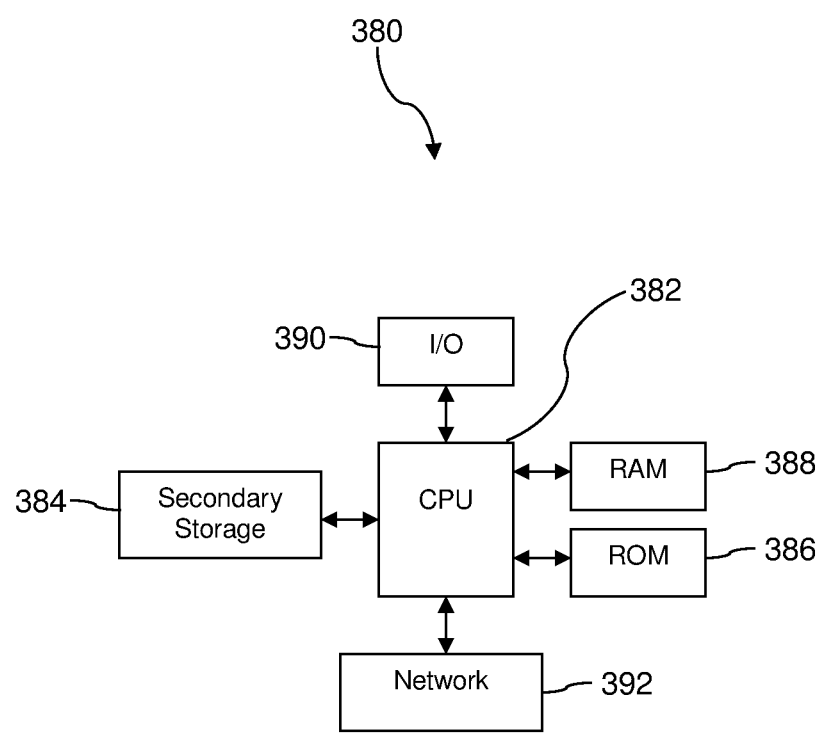
FIG. 6 is a block diagram of a computer system according to an embodiment of the disclosure.

FIG. 6 illustrates a computer system 380 suitable for implementing one or more aspects of embodiments disclosed herein. For example, one or more of the transaction sequencer 102, the POS terminals 104, 106, 108, the payment switch 112, the payment transaction processing systems 114, and/or the list management system 120 described above with reference to FIG. 1 may be implemented in a form which is substantially similar to the computer system 380 described below. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

The disclosed redemption payment system comprising a transaction sequencer may be further described by the following enumerated embodiments:

1. A transaction sequencer, comprising:
   a processor;
   a non-transitory memory; and
   an application stored in the non-transitory memory that, when executed by the processor
      receives a payment transaction message comprising information about a first purchase item, wherein the payment transaction message was created by a point-of-sale (POS) after a filtering step that assured that the first purchase item is associated with a master approved item list,
      searches a plurality of different approved product lists using the information about the first purchase item, wherein the plurality of different approved product lists comprise a first approved product list and a second approved product list,
      creates a first transaction based on finding the first purchase item in the first approved product list,
      transmits the first transaction to a first transaction processing system,
      receives a first response from the first transaction processing system, bundles the first response in a unified response, and
      transmits the unified response.

2. The transaction sequencer of 1, wherein the payment transaction message further comprises information about a second purchase item, wherein the payment transaction message was created by the point-of-sale after a filtering step that assured that the second purchase item is associated with the master approved item list, wherein the application further:
   creates a second transaction based on finding the second purchase item in the second approved product list,
   transmits the second transaction to a second transaction processing system,
   receives a second response to the second transaction processing system,
   bundles the second response in a unified response, and
   transmits the unified response.

3. The transaction sequencer of 2, wherein the first transaction processing system and the second transaction processing system are the same transaction processing system.

4. The transaction sequencer of 1, wherein the payment transaction message identifies a payment entity, wherein the payment entity is associated with the first approved product list and with the second approved product list.

5. The transaction sequencer of 4, wherein the first purchase item is identified in both the first approved product list and in the second approved product list, wherein the first transaction requests payment from a first payment account associated with the first approved product list based on evaluating a rule defined by the payment entity.

6. The transaction sequencer of 1, wherein the first product list comprises one of a food stamp approved product list, a flexible spending account (FSA) approved product list, a wellness program approved product list, or a women, infants, and children (WIC) approved product list.

7. The transaction sequencer of 1, wherein the payment transaction message is received from a point-of-sale terminal and the unified response is sent to the point-of-sale terminal.

8. An approved product list management system, comprising:
   a processor;
   a non-transitory memory; and
   an application stored in the non-transitory memory that, when executed by the processor,
      builds a first master approved product list that identifies the products identified in a plurality of approved product lists,
      transmits the first master approved product list to a first point-of-sale terminal and to a second point-of-sale terminal,
      builds a second master approved product list based on a change in one of the approved product lists, and
      transmits the second master approved product list to the first point-of-sale terminal and to the second point-of-sale terminal.

9. The approved product list management system of 8, wherein the plurality of approved product lists comprise at least one of a food stamp approved product list, a flexible spending account (FSA) approved product list, a wellness program approved product list, or a women, infants, and children (WIC) approved product list.

10. The approved product list management system of 8, wherein the first point-of-sale terminal is associated with a first business, wherein the second point-of-sale terminal is associated with a second business, and wherein the first business is different from the second business.

11. The approved product list management system of 8, wherein the application is designed to exclude duplicate products entries from the master approved product lists.

12. The approved product list management system of 8, wherein the application further transmits the change in the one of the approved product list to a transaction sequencer, wherein the transaction sequencer receives transaction requests from the first and second point-of-sale terminals and transmits transaction responses to the first and second point-of-sale terminals.

13. A method of payment transaction handling, comprising:
receiving a first transaction message comprising identification of a first purchase item, wherein the first purchase item is identified in a master approved product list propagated to a plurality of point-of-sale terminals;
searching a first approved product list for the first purchase item, where the first approved product list is associated with a first payment program identified in the first transaction message and all the items in the first approved product list are identified in the master approved product list;
when the first approved product list comprises the first purchase item, completing a payment transaction for the first purchase item;
receiving a second transaction message comprising identification of a second purchase item, wherein the second purchase item is identified in the master approved product list;
searching a second approved product list for the second purchase item, where the second approved product list is associated with a second payment program identified in the second transaction message, where all the items in the second approved product list are identified in the master approved product list, and where the first approved product list is different from the second approved product list; and
when the second approved product list comprises the second purchase item, completing a payment transaction for the second purchase item.

14. The method of payment transaction handling of 13, wherein the first payment plan is identified by a bank identification number (BIN) in the first transaction message.

15. The method of payment transaction handling of 13, wherein the first transaction message comprises identification of a third purchase item, wherein the third item is identified in the master approved product list, further comprising:
searching a third approved product list for the third purchase item, where the third approved product list is associated with the first payment program identified in the first transaction message and all the items in the third approved product list are identified in the master approved product list; and
when the third approved product list comprises the third purchase item, completing a payment transaction for the third purchase item.

16. The method of payment transaction handling of 15, wherein completing the payment transaction for the first purchase item comprises creating a first ISO 8583 transaction and transmitting the first ISO 8583 transaction to a first transaction processing system and wherein completing the payment transaction for the third purchase item comprises creating a second ISO 8583 transaction and transmitting the second ISO 8583 transaction to a second transaction processing system.

17. The method of payment transaction handling of 16, wherein the first transaction processing system is the same as the second transaction processing system.

18. The method of payment transaction handling of 15, wherein completing the payment transaction for the first purchase item and completing the payment transaction for the third purchase item comprising stitching together a first transaction response associated with the payment transaction for the first purchase item with a second transaction response associated with the payment transaction for the third purchase item.

19. The method of payment transaction handling of 13, wherein the first approved product list is one of a food stamp approved product list, a flexible spending account (FSA) approved product list, a wellness program approved product list, or a women, infants, and children (WIC) approved product list.

20. The method of payment transaction handling of 13, wherein the first transaction message comprises universal product code (UPC) information, price information, quantity information about the first purchase item.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A transaction sequencing and approved product list management system comprising:
a plurality of third party point-of-sale terminals, wherein each of the plurality of third party point-of-sale terminals comprise a tagged product list, wherein the tagged product list comprises all available products for purchase via the plurality of third party point-of-sale terminals;
a transaction sequencer, the transaction sequencer comprising a central processor unit,
a non-transitory memory, and an application stored in the non-transitory memory that,
when executed by the central processor unit:
builds a first master approved product list that identifies all products identified in a plurality of approved product lists,
transmits the first master approved product list to a first point-of-sale terminal and to a second point-of-sale terminal, wherein the first point-of-sale terminal and the second point-of-sale terminal are check-out clerk operated, builds a second master approved product list based on a change in one approved product list of the plurality of approved product lists, transmits the second master approved product list to the first point-of-sale terminal and to the second point-of-sale terminal; and transmits the change in the one of the approved product lists to the transaction sequencer, wherein the transaction sequencer receives transaction requests from the first and second point-of-sale terminals which have been filtered by the first and second point-of-sale terminals to remove any tagged product list products which do not comprise the plurality of approved product lists, determines what payment tenders will be used for which purchase items comprising the plurality of approved product lists, and transmits transaction responses to the first and second point-of-sale terminals.

2. The transaction sequencing and approved product list management system of claim 1, wherein the plurality of approved product lists comprise at least one of a food stamp approved product list, a flexible spending account (FSA) approved product list, a wellness program approved product list, or a women, infants, and children (WIC) approved product list.

3. The transaction sequencing and approved product list management system of claim 1, wherein the first point-of-sale terminal is associated with a first business, wherein the second point-of-sale terminal is associated with a second business, and wherein the first business is different from the second business.

4. The transaction sequencing and approved product list management system of claim 1, wherein the application is designed to exclude duplicate products entries from the master approved product lists.

5. The transaction sequencing and approved product list management system of claim 1, wherein the plurality of third party of terminals is from a plurality of merchants.

* * * * *